(12) United States Patent
Robison et al.

(10) Patent No.: US 10,990,706 B2
(45) Date of Patent: Apr. 27, 2021

(54) VALIDATION OF DATA INTEGRITY THROUGH WATERMARKING

(71) Applicant: Dell Products, L.P., Round Rock, TX (US)

(72) Inventors: Charles D. Robison, Buford, GA (US); Andrew T. Fausak, Coppell, TX (US); Abeye Teshome, Austin, TX (US); Ricardo L. Martinez, Leander, TX (US); Girish S. Dhoble, Austin, TX (US); Carlton A. Andrews, Austin, TX (US); David Konetski, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 479 days.

(21) Appl. No.: 15/962,641

(22) Filed: Apr. 25, 2018

(65) Prior Publication Data

US 2019/0332811 A1    Oct. 31, 2019

(51) Int. Cl.
*G06F 21/00*    (2013.01)
*G06F 21/64*    (2013.01)
(Continued)

(52) U.S. Cl.
CPC ........ *G06F 21/645* (2013.01); *G06F 9/45558* (2013.01); *G06F 21/57* (2013.01);
(Continued)

(58) Field of Classification Search
CPC .... G06F 21/645; G06F 21/57; G06F 9/45558; G06F 2009/45587; H04L 63/12;
(Continued)

(56) References Cited

U.S. PATENT DOCUMENTS 8,121,264 B1 *  2/2012  Hogg, Jr. ............ H04M 1/6505
                                                        379/88.22
10,147,433 B1 * 12/2018  Bradley ................ G10L 19/018
(Continued)

FOREIGN PATENT DOCUMENTS

CN            104537318 A    *   4/2015

OTHER PUBLICATIONS

Translation of CN104537318A (Year: 2015).*

*Primary Examiner* — Kendall Dolly
(74) *Attorney, Agent, or Firm* — Fogarty LLP

(57) ABSTRACT

Systems and methods are provided for recording and validating modifications to a secured container. Modifications to the secured container by trusted parties are logged. The log may be maintained in a secured memory of an IHS (Information Handling System) and may be periodically validated. Each logged modification specifies a timestamp of the modification and the digital watermark assigned to the trusted party making the modification. Upon completing modifications, the secured container is sealed by imprinting the first digital watermark and the first timestamp at locations in the secured container specified by a watermarking algorithm assigned to the trusted party making the modification. Additional modifications may be serially watermarked on the secured container according the watermarking algorithm of the trusted party making each modification. The secured container is unsealed by re-applying each of the watermarking algorithms in reverse order. The integrity of the secured container, and each modification, is thus validated.

18 Claims, 5 Drawing Sheets

(51) Int. Cl.
*G06F 21/57* (2013.01)
*H04L 29/06* (2006.01)
*G06F 9/455* (2018.01)
*H04L 9/32* (2006.01)

(52) U.S. Cl.
CPC ............ *H04L 9/3247* (2013.01); *H04L 63/12* (2013.01); *G06F 2009/45587* (2013.01); *H04L 2209/608* (2013.01); *H04L 2463/121* (2013.01)

(58) Field of Classification Search
CPC ............ H04L 9/3247; H04L 2209/608; H04L 2463/121; H04L 9/3297
See application file for complete search history.

(56) References Cited

U.S. PATENT DOCUMENTS

| | | | |
|---|---|---|---|
| 10,236,031 B1* | 3/2019 | Gurijala | G11B 27/323 |
| 10,331,895 B1* | 6/2019 | Roth | G06F 21/602 |
| 2003/0046238 A1* | 3/2003 | Nonaka | H04H 60/18 |
| | | | 705/51 |
| 2005/0063027 A1* | 3/2005 | Durst, Jr. | G07F 7/005 |
| | | | 359/2 |
| 2006/0239500 A1* | 10/2006 | Meyer | H04N 1/32165 |
| | | | 382/100 |
| 2015/0261811 A1* | 9/2015 | Muhlestein | G06F 16/2358 |
| | | | 707/758 |
| 2016/0292049 A1* | 10/2016 | Kandukuri | G06F 11/1451 |
| 2018/0136931 A1* | 5/2018 | Hendrich | G06F 11/302 |
| 2018/0248701 A1* | 8/2018 | Johnson | H04L 9/3236 |
| 2020/0296089 A1* | 9/2020 | Hsiung | H04L 9/3273 |

* cited by examiner

VALIDATION OF DATA INTEGRITY THROUGH WATERMARKING

FIELD

This disclosure relates generally to Information Handling Systems (IHSs), and more specifically, to providing secured access to data via IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An enterprise may employ a wide variety of IHSs within an enterprise system. An enterprise system utilizes IHSs to provide employees with access to the tools and business data required to perform their job functions. An enterprise system is required to support employee productivity, while also placing paramount importance on protecting business data, both from loss and misuse. The difficulty of supporting employee productivity while protecting business data has been greatly compounded by the advent of the modern workplace settings in which employees may expect to access business data from a variety of different locations and are not restricted to the use of a single IHS.

One of the difficulties in securing a modern enterprise system is detecting and mitigating the effects of an employee accessing business data from an IHS that has been compromised. Malicious software, such as computer viruses, may be surreptitiously or unintentionally installed on an IHS utilized by an employee. One tactic employed by such malicious software programs is to appropriate data that is stored by an IHS. Such data thefts may provide malicious actors with valuable financial information and information that may be used in identity thefts. Another tactic employed by malicious actors is the use ransomware that infects an IHS and encrypts data stored by the IHS. The malicious actor may then extort a ransom in order for the owner of the IHS to regain access to the encrypted data.

One technique for protecting enterprise data is to monitor the state of a component storing the enterprise data in order to detect whether the component has been compromised. If the integrity of the component providing access to the enterprise data cannot be validated, access to the enterprise data may be revoked. By monitoring the state of a component, any changes to the component may thus be detected. In certain scenarios, however, components may require modifications, in which case the integrity of the modifications also need to be validated in order to validate the integrity of the component.

SUMMARY

In various embodiments, methods are provided for recording and validating modifications to a secured container. The method include: logging a first modification to the secured container by a first trusted party and a second modification to the secured container by a second trusted party, wherein the first logged modification identifies a first timestamp of the first modification and further identifies a first digital watermark assigned to the first trusted party, and wherein the second logged modification identifies a second timestamp of the second modification and further identifies a second digital watermark assigned to the second trusted party; and sealing the secured container by imprinting the first digital watermark and the first timestamp at locations in the secured container specified by a first watermarking algorithm assigned to the first trusted party and subsequently imprinting the second digital watermark and the second timestamp at locations in the secured container specified by a second watermarking algorithm assigned to the second trusted party.

In certain additional embodiments, the methods further include: generating a reference signature based on a state of the secured container prior to the first modification to the secured container and the second modification to the secured container. In certain additional embodiments, the methods further include: unsealing the secured container by removing the imprint of the second digital watermark and the second timestamp at the locations in the secured container specified by the second watermarking algorithm and subsequently removing the imprint of the first digital watermark and the first timestamp at locations in the secured container specified by the first watermarking algorithm. In certain additional embodiments, the methods further include: generating an updated signature based on a state of the unsealed secured container; and validating the integrity of the secured container by comparing the updated signature to the reference signature. In certain additional embodiments of the methods, the first watermarking algorithm specifies an initialization point to begin imprinting the first digital watermark. In certain additional embodiments of the methods, the first watermarking algorithm specifies a frequency for imprinting the first digital watermark. In certain additional embodiments of the methods, the first digital watermark is imprinted via an XOR operation at the locations in the secured container specified by the first watermarking algorithm. In certain additional embodiments of the methods, the imprinting of the first digital watermark is reversed via the XOR operation at the locations in the sealed secured container specified by the first watermarking algorithm.

In various embodiments, Information Handling Systems (IHSs) include: one or more processors; a secured memory; a system memory coupled to the one or more processors, the system memory including program instructions stored thereon that, upon execution by the one or more processors, cause the IHS to: log a first modification to a secured container by a first trusted party and a second modification to the secured container by a second trusted party, wherein the first logged modification identifies a first timestamp of the first modification and further identifies a first digital watermark assigned to the first trusted party, and wherein the second logged modification identifies a second timestamp of the second modification and further identifies a second digital watermark assigned to the second trusted party; and seal the secured container by imprinting the first digital watermark and the first timestamp at locations in the secured container specified by a first watermarking algorithm assigned to the first trusted party and subsequently imprinting the second digital watermark and the second timestamp at locations in the secured container specified by a second watermarking algorithm assigned to the second trusted party.

In certain additional IHS embodiments, the log is stored to the secured memory. In certain additional IHS embodiments, the program instructions further causing the one or more processors to: generate a reference signature based on a state of the secured container prior to the first modification to the secured container and the second modification to the secured container. In certain additional IHS embodiments, the program instructions further causing the one or more processors to: unseal the secured container by removing the imprint of the second digital watermark and the second timestamp at the locations in the secured container specified by the second watermarking algorithm and subsequently removing the imprint of the first digital watermark and the first timestamp at locations in the secured container specified by the first watermarking algorithm. In certain additional IHS embodiments, the program instructions further causing the one or more processors to: generate an updated signature based on a state of the unsealed secured container; and validate the integrity of the secured container by comparing the updated signature to the reference signature. In certain additional IHS embodiments, the first watermarking algorithm specifies an initialization point to begin imprinting the first digital watermark. In certain additional IHS embodiments, the first watermarking algorithm specifies a frequency for imprinting the first digital watermark. In certain additional IHS embodiments, the first digital watermark is imprinted via an XOR operation at the locations in the secured container specified by the first watermarking algorithm. In certain additional IHS embodiments, the imprinting of the first digital watermark is reversed via the XOR operation at the locations in the sealed secured container specified by the first watermarking algorithm.

In various additional embodiments, computer-readable storage devices include program instructions stored thereon for recording and validating modifications to a secured container. Upon execution by one or more processors of the IHS, the program instructions cause the one or more processors to: log a first modification to a secured container by a first trusted party and a second modification to the secured container by a second trusted party, wherein the first logged modification identifies a first timestamp of the first modification and further identifies a first digital watermark assigned to the first trusted party, and wherein the second logged modification identifies a second timestamp of the second modification and further identifies a second digital watermark assigned to the second trusted party; and seal the secured container by imprinting the first digital watermark and the first timestamp at locations in the secured container specified by a first watermarking algorithm assigned to the first trusted party and subsequently imprinting the second digital watermark and the second timestamp at locations in the secured container specified by a second watermarking algorithm assigned to the second trusted party.

In certain additional storage device embodiments, the program instructions further causing the one or more processors of the IHS to: generate a reference signature based on a state of the secured container prior to the first modification to the secured container and the second modification to the secured container. In certain additional storage device embodiments, the program instructions further causing the one or more processors of the IHS to unseal the secured container by removing the imprint of the second digital watermark and the second timestamp at the locations in the secured container specified by the second watermarking algorithm and subsequently removing the imprint of the first digital watermark and the first timestamp at locations in the secured container specified by the first watermarking algorithm.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
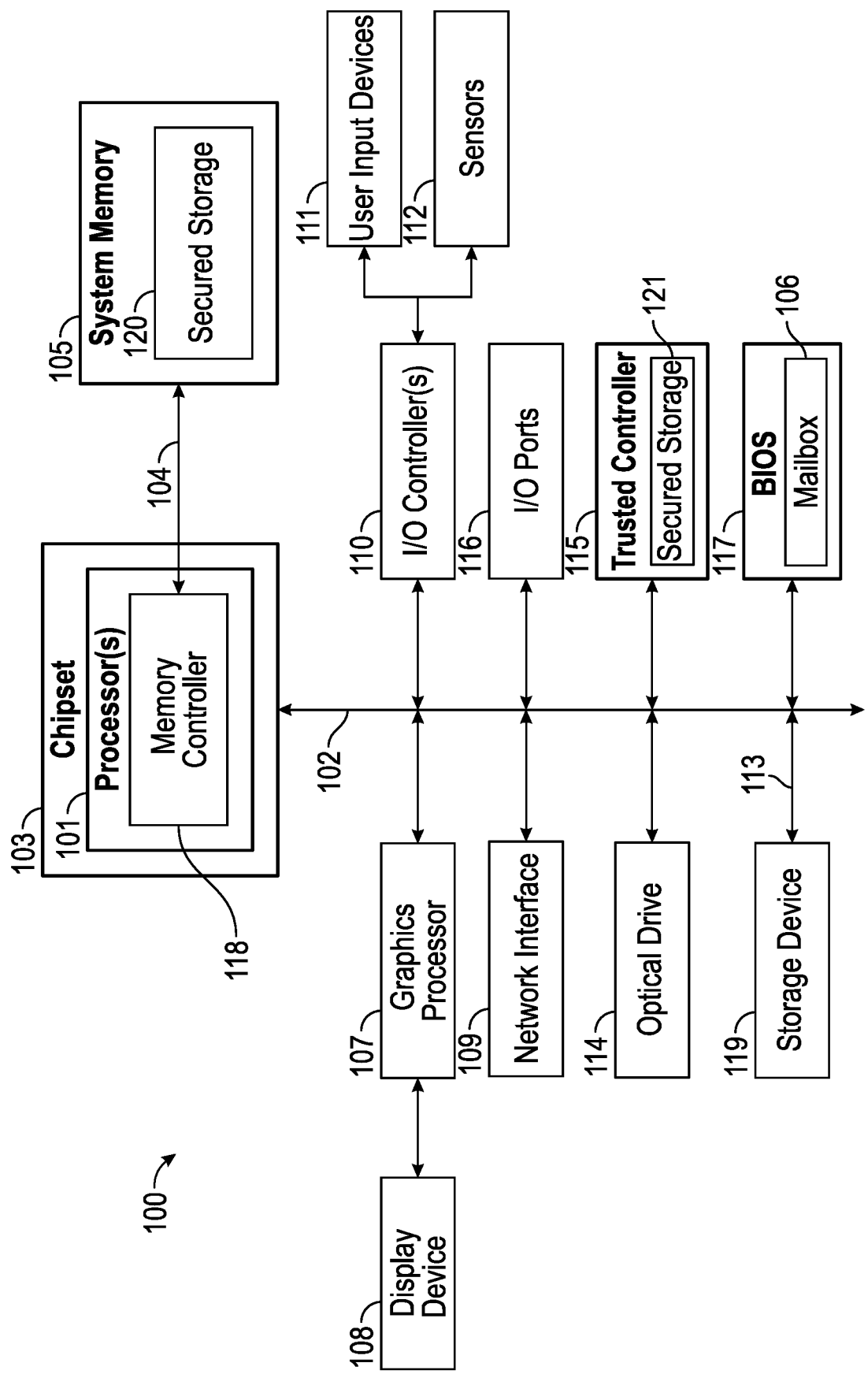
FIG. 1 is a block diagram depicting certain components of an IHS configured according to various embodiments to record and validate modifications to a secured container.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 illustrates certain components of an IHS 100 configured according to certain embodiments to record and validate the modifications to a secured container that provides access to enterprise data by imprinting watermarks within the secured container that may be used to validate the integrity of the modifications. In various embodiments, IHS 100 may execute program instructions that cause IHS 100 to perform certain of the operations disclosed herein. While a single IHS 100 is illustrated in FIG. 1, IHS 100 may be a component of an enterprise system that may include any number of additional IHSs that may also record and validate the modifications to a secured container in the same or similar manner to IHS 100.

IHS 100 includes one or more processors 101, such as a Central Processing Unit (CPU), to execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 via the memory bus 104 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, system memory 105 includes a secured storage 120 that may be a portion of the system memory designated for storage of logs for use in tracking and validating modifications to a secured container and for storage of signature data for use in validating the integrity of a secured container.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH.

Chipset 103 may also provide access to one or more display device(s) 108 via graphics processor 107. In certain embodiments, graphics processor 107 may be comprised within one or more video or graphics cards or an embedded controller installed as components of the IHS 100. Graphics processor 107 may generate display information and provide the generated information to one or more display device(s) 108 coupled to the IHS 100. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. The user input devices may interface with the I/O controller 110 through wired or wireless connections. Sensors 112 accessed via I/O controllers 110 may provide access to data describing environmental and operating conditions of IHS 100. Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiments, BIOS 117 includes a predefined memory or memory region that may be referred to as a NVM (Non-Volatile Memory) mailbox 106. In such embodiments, the mailbox 106 may provide a secured storage location for storage of logs for use in tracking and validating modifications to a secured container and for storage of signature data for use in validating the integrity of a secured container. BIOS mailbox 106 may be utilized in this manner instead of, or in conjunction with, integrity validations implemented by trusted controller 115.

In the illustrated embodiment, a trusted controller 115 is coupled to IHS 100. In certain embodiments, the trusted controller 115 is an embedded controller that is installed as a component of the motherboard of IHS 100. In certain embodiments, trusted controller 115 may be a Trusted Platform Module that is configured to verify the integrity of certain components of IHS 100, including secured containers. In certain embodiments, trusted controller 115 may be configured to calculate signatures that uniquely identify individual components of IHS 100. In such scenarios, trusted controller 115 may calculate a hash value based on the configuration of a hardware and/or software component coupled to IHS 100. For instance, trusted controller 115 may calculate a hash value based on the contents of a components, such as a secured container. In certain scenarios, a reference signature may be generated based on certain of the files that comprise a container, such as libraries, binaries and configuration files. Such a hash value may be maintained in the secure storage 121 as a reference signature.

The trusted controller 115 may be further configured to recalculate a hash value at a later time for such a component. The hash value that is recalculated for the component may then be compared against the reference hash value signature in order to determine if any modifications have been made to a component, thus indicating the component has been compromised. In this manner, the trusted controller 115 may be used to validate the integrity of hardware and software components installed on IHS 100. In certain embodiments, signatures may be calculated in this same manner by components other than trusted controller 115. In certain embodiments, signatures may be calculated remotely from the IHS via a remote service.

In various embodiments, an IHS 100 does not include all of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the processor 101 as systems-on-a-chip.

Figure 2:
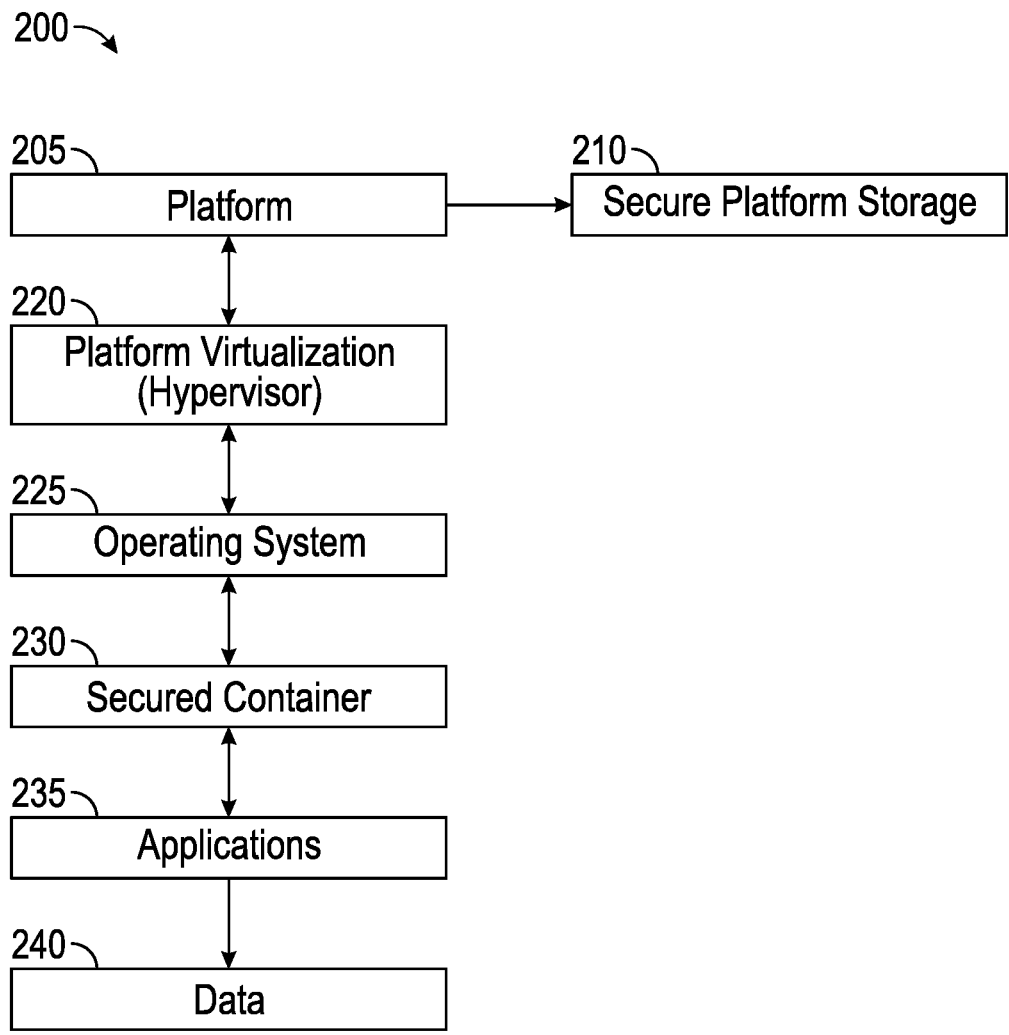
FIG. 2 is a block diagram depicting certain components of a system configured according to various embodiments to record and validate modifications to a secured container.

FIG. 2 is block diagram illustrating certain components of a system 200 for recording and validating modifications to a secured container 230 according to various embodiments. As illustrated, at one end of the system 200 is the platform 205 from which a user may access secured data 240 and/or a secured software application 235 provided within the secured container 230. In certain embodiments, the platform 205 may be implemented by the hardware, firmware and software of an IHS, such as IHS 100 described with respect to FIG. 1. Accordingly, platform 205 may be a personal computing device, such as a laptop, desktop, tablet, 2-in-1 convertible device, or a smart phone, capable of interfacing with an enterprise system and hosting a secured virtual environment 230.

As described with regard to FIG. 1, an IHS may include one or more secured data storages. For example, the secured platform data storage 210 may be implemented as a secured storage 121 of a trusted controller 115 that operates independently of the operating system of the IHS 100. Also as described with respect to FIG. 1, an IHS 100 may implement one or more secured storages, such as a designated secured memory area of the system memory 105 or as a mailbox storage of BIOS 117. Referring back to FIG. 2, platform 205 similarly includes a secured platform storage 210 that is independent of operating system 225.

In the embodiment of FIG. 2, platform 205 supports a platform virtualization layer 220, which may be referred to in certain scenarios as a hypervisor. The platform virtualization layer 220 allows multiple virtual machines to run concurrently on platform 205, where each virtual machine may host a different instantiated operating system 225. The hypervisor 220 provides a virtual machine container that presents a logical hardware interface to the operating system(s) 225 installed on platform 205. By utilizing a platform virtualization layer 220, multiple different operating systems 225 may run concurrently on a single platform 205, while isolating the operating system 225 from the hardware and firmware used to implement platform 205.

In certain scenarios, the system 200 of FIG. 2 may be a component of an enterprise computing system by which an enterprise may provide users with controlled access to secured data 240 via one or more software applications 235. In certain scenarios, one or more of the software applications 235 installed on platform 205 may be secured such that user are provided with controlled access to these software applications. In the illustrated embodiment, users are provided access to secured data 240 and/or secured software applications 235 via a secured container 230 provided within an operating system 225 installed on platform 205. The secured container 230 may include tools and resources necessary for a particular user to access secured data 240 and/or a secured application 235 according to policies that specify restrictions on the user's access.

In this manner, an enterprise user may be provided with access to enterprise data and the tools necessary for user to perform job functions involving enterprise data or applications, thus promoting the user's productivity, while maintaining the secured data 240 and/or secured software application 235 protected within the secured container 230. In certain scenarios, the described secured container 230 may be referred to as a virtual environment or a workspace. In certain embodiments, a secured container 230 may represent a virtual machine operated by hypervisor 220.

Figure 3:
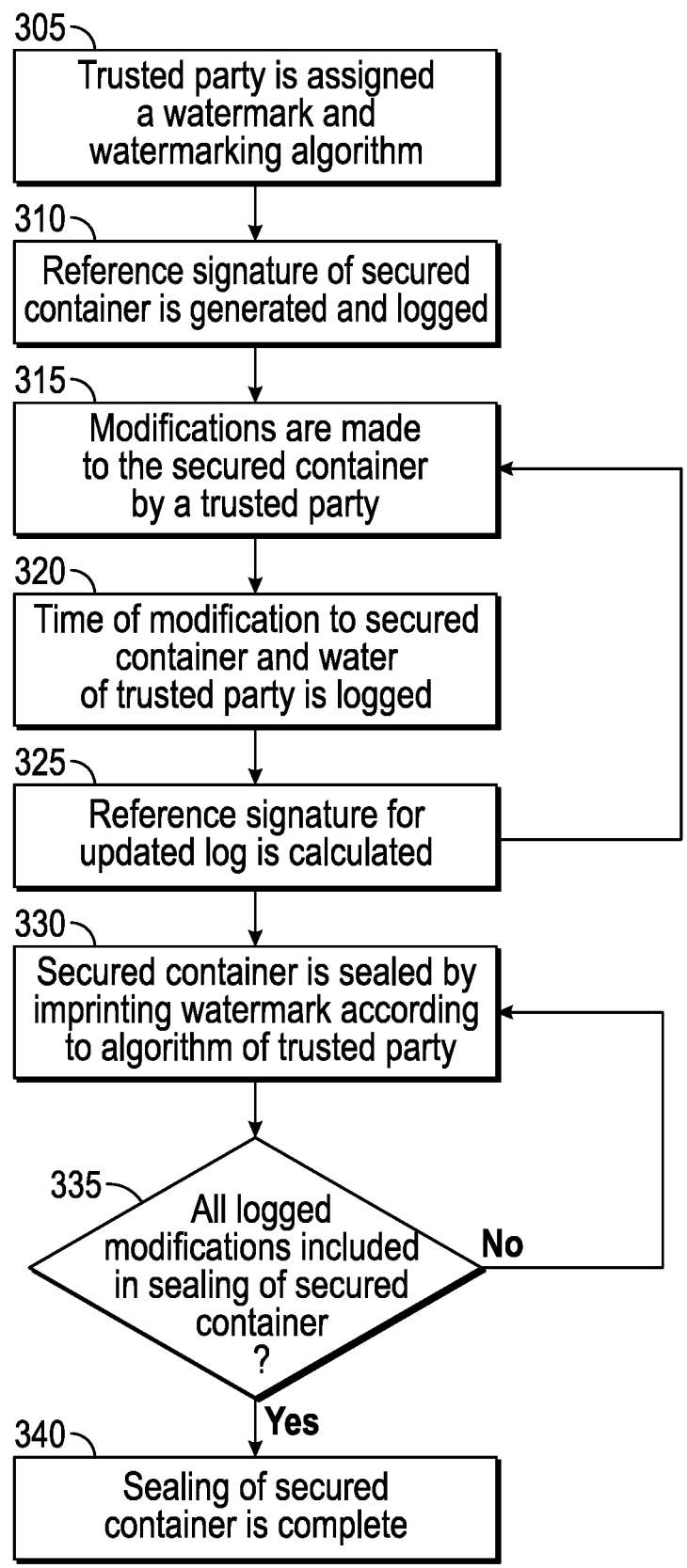
FIG. 3 is a flowchart diagram depicting certain steps of a process according to various embodiments for recording modifications to a secured container using imprinted watermarks.

FIG. 3 illustrates certain steps of a process according to various embodiments for sealing a secured container with imprinted watermarks that record changes made to the secured container such that the integrity of the changes to the secured container may be validated. In the illustrated embodiment, the process begins at step 305 with the assignment of a unique digital watermark to a trusted party that is authorized to make changes to a secured container. In certain embodiments, the digital watermark assigned to each trusted party is a unique key, alphanumeric value or other such value that may uniquely identify an individual trusted party. In certain scenarios, a trusted party may be an administrator or software developer that is authorized to make changes to a secured container. For instance, a secured container may be a virtual environment that has been configured to provide access to secured data, such as enterprise data. As described, administration of an IHS and/or the secured container may require changes to the secured container.

In addition to assigning each trusted party a digital watermark, a watermark algorithm may also be assigned to each trusted party at step 305. The assigned watermarking algorithms may specify a process for the locations within the secured container at which a trusted party's watermark will be imprinted. For instance, the algorithm for watermarking may specify an initialization point within the secured container at which a specific trusted party's watermark imprint will begin. In certain embodiments, each trusted party may be assigned a unique initialization point. The initialization point may be defined as a function of the size of the secured container. For instance, each trusted party may be assigned a unique initialization point that is an offset from the beginning of the secured container file to be watermarked, where the offset is calculated as a percentage of the size of the secured container file.

The watermarking algorithm assigned to each trusted party may also specify a frequency at which watermarks will be imprinted within the secured container. Certain secured containers may be large files, such as a secured container that is used to represent the state of a virtual environment or a virtual machine. Integrity validations for large secured container files may become unacceptably slow if validation requires processing a large number of watermarks that are imprinted within the file.

The assigned watermarking algorithms may be configured in a manner that limits the time required to validate the watermarked changes to a secured container by configuring the frequency at which watermarks are imprinted as a function of the size of the secured container. For instance, a watermarking algorithm may specify a watermark frequency for a specific trusted party, where the frequency is a ratio of the size of the secured container to be imprinted with watermarks. In certain embodiments, the watermarking algorithm assigned to a trusted party may specify a unique watermarking frequency for that trusted party.

As described, an IHS may include one or more secured storages, such as a secured storage provided by a trusted controller, a secured storage within a BIOS, or as a secured area designated in system memory. The integrity of these secured storages may be validated by the described comparison of signatures calculated based on the contents of the secured storage locations. The digital watermark and watermarking algorithm that are assigned to a trusted party may be stored to a log maintained in such a secured storage location. A signature of this log may be calculated based on the contents of the log in secured memory. A calculated signature may then be compared to a reference signature in order to determine whether any changes have been to the log. Based on such signature comparisons, the watermarks and watermarking algorithms assigned to a trusted party and stored to such logs may thus be validated to ensure their integrity prior to imprinting the secured container with watermarks.

At step 310, a reference signature may be calculated based on the contents of the secured container file prior to the imprinting the secured container with watermarks. This reference signature represents the state of the secured container prior to a trusted party making modifications to the secured container that would alter the secured container such that calculation of a signature based on the contents of modified secured container would generate a signature that does not match the reference signature. The reference signature calculated for the secured container may be stored to the log maintained in secure storage along with the assigned watermarks and watermarking algorithms.

Upon logging the reference signature, at step 315, the trusted party may be allowed to make modifications to the secured container. As described, such changes may be required for various reasons, such as to repair issues identified in the secured container, to provide security upgrades, or to provide upgraded functionality via the secured container. At step 320, the modifications made by the trusted party are recorded to the log maintained in the secured storage. Modifications may be logged by specifying the assigned watermark of the trusted party making the modification and a timestamp corresponding to the time the modification was applied to the secured container.

With the log modified to reflect the modifications to the secured container by the trusted party, at step 325, an updated reference signature may be calculated based on the contents of the updated log. As illustrated, the process may return to step 315 as additional changes are made to the secured container. The additional changes may be made by the same trusted party, or a different trusted party than the previous modification. Each modification may be logged to the secured storage as described.

Upon completion of modifications to the secured container, at step 330, the secured container may be sealed with imprinted watermarks that correspond to the modifications. Each modification listed in the secured log may be watermarked in the secured container file according to the watermarking algorithm of the trusted party make the respective modification. The process for imprinting watermarks on a secured container is described in additional detail with regard to FIG. 5. If, at step 335 additional modification to the secured container have not been recorded in the secured container by watermarking, each remaining modification is successively imprinted on the secured container according to the watermarking algorithm of the trusted party making the modification. When all modifications listed in the secured log have been imprinted in the secured container as watermarks, at step 340, the secured container is now sealed and reflects each of the individual modifications that have been logged such that the integrity of modifications may be validated.

Figure 4:
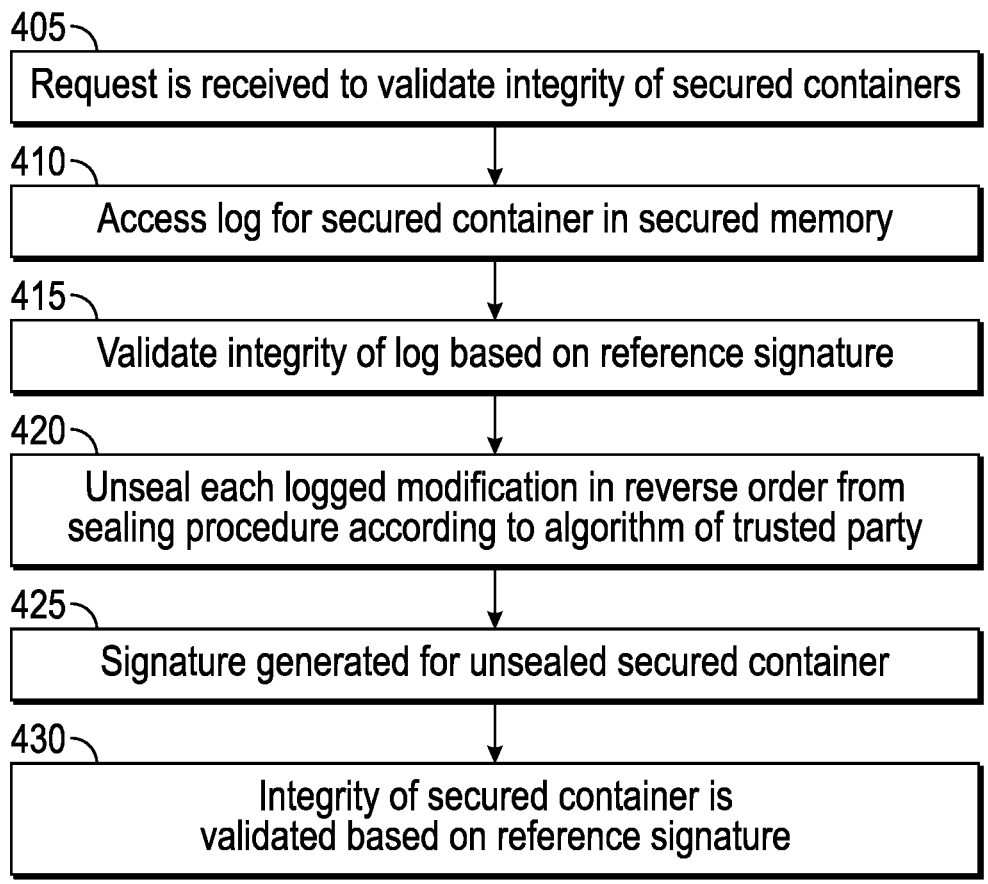
FIG. 4 is a flowchart diagram depicting certain steps of an additional process according to various embodiments for recording modifications to a secured container using imprinted watermarks.

FIG. 4 illustrates certain steps of a process according to various embodiments for unsealing a secured container that has been watermarked to indicate modifications to the secured container as described with regard to FIG. 3, and subsequently validating the integrity of the unsealed secured container. The illustrated embodiment begins at step 405 with the receipt of a request to validate the integrity of a secured container that has been sealed as described. For instance, a secured container corresponding to a virtual environment may be periodically validated during operation of the virtual environment in order to determine whether the virtual environment has been compromised. At step 410, the log corresponding to the sealed, secured container to be validated may be identified within the secured storage. As described, modifications to a secured container may be logged to a secured storage of the IHS. The logged modifications may specify the watermark of the trusted party making each modification and the time of the modification.

At step 415, the integrity of the secured log may be validated prior to unsealing the secured container and validating the modifications listed in the log. In certain scenarios, upon completion of each modification or set of modifications to the secured container, an updated reference signature may be calculated based on the contents of the log maintained in secured storage. The modifications listed in the log may thus be validated based on the reference signature of the log. At step 415, a signature may be calculated based on the contents of the secured log and compared to the reference signature for the log in order to validate the integrity of the log itself.

With the integrity of the secured log validated, at step 420, the secured container may be unsealed based on the modifications listed therein. As described in additional detail with regard to FIG. 5, the unsealing of a secured container is conducted by applying an operation on the secured container that reverses each of the digital watermarks that were imprinted on the secured container, where the reversing operations for each modification are applied at the locations in the secured container specified by the imprinting algorithm of the trusted party that made the modification. In addition, the unsealing of the secured container applies the reverse watermark operations in the reverse order of the watermark imprinting process described with regard to FIG. 3. For instance, if the modifications listed in the secured log where imprinted in chronological order according to the timestamp of the modifications, the unsealing process at step 420 is conducted in the reverse chronological order of the modifications. In another illustrative scenario, the modifications to the secured container may be imprinted such that all of the modifications made by an individual trusted party are grouped together and each iteration of the watermarking process of step 330 of FIG. 3 records the modifications made be an individual trusted party. In such scenarios, the order of the trusted parties used for imprinting the watermarks is used in reverse to unseal the secured container.

After the secured container has been unsealed and the imprints of the watermarking process have been reversed, at step 425, a signature is calculated for the resulting unsealed secured container. Based on this calculated signature for the secured container, the integrity of the secured container may be validated based on comparison to the reference signature stored in the secured log at step 310 of FIG. 3. At step 430, the integrity of the secured container may be determined based on this comparison. If the calculated signature matches the reference signature, the unsealing of the secured container has correctly reversed the watermarks imprinted during the sealing process and the integrity of the modifications to the secured container may be validated. In this manner, the individual changes to the secured container and the secured container itself may be validated.

Figure 5:
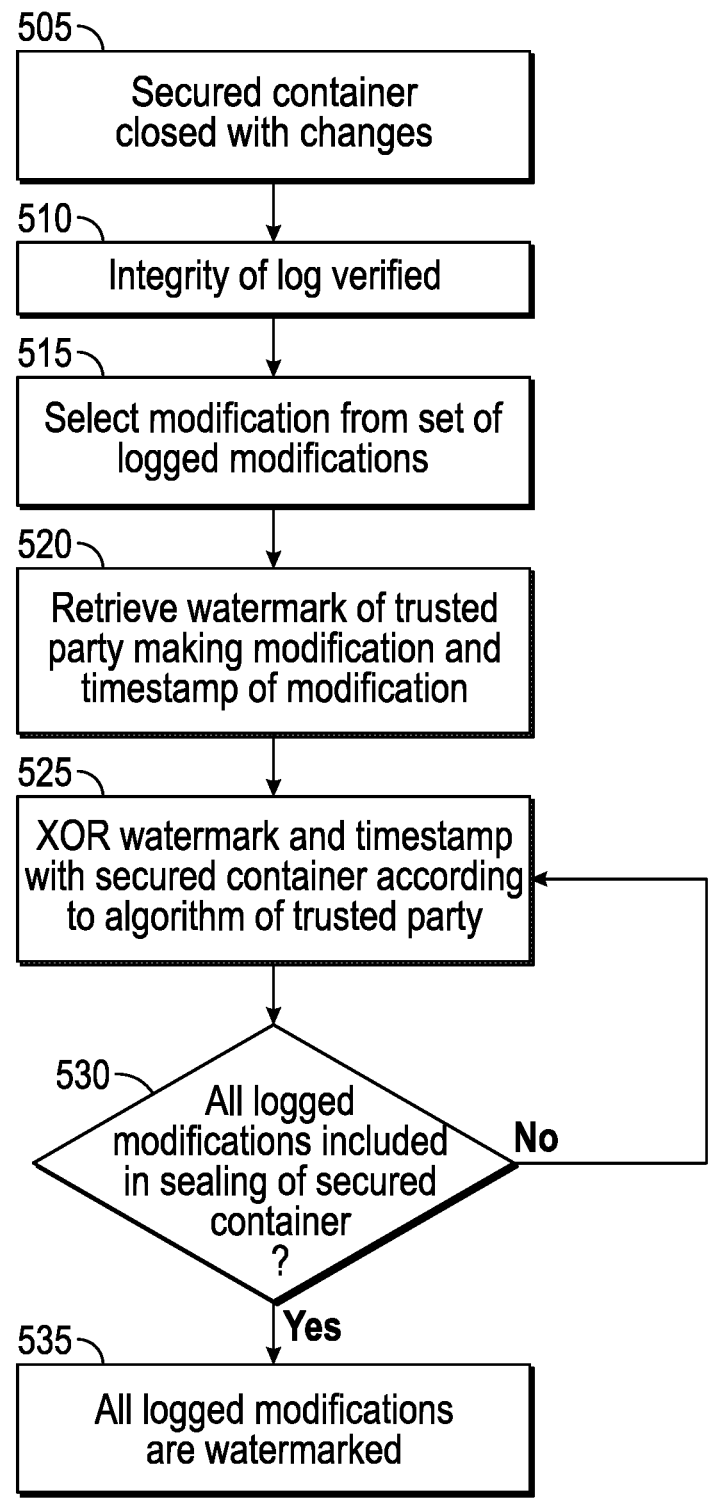
FIG. 5 is a flowchart diagram depicting certain steps of a process according to various embodiments for validating the integrity of imprinted watermarks that record modifications to a secured container.

FIG. 5 illustrates certain steps of a process according to certain embodiments for imprinting a secured container with watermarks that record modifications made to the secured container by trusted parties. The process may begin at step 505 with the closing of a secured container that has been modified by one or more trusted parties. In certain scenarios, a secured container may be closed at the end of a development cycle, after which upgraded features and repairs may be available via the modified secured container. As described, each such modification may be recorded to a secured log, where each modification may be indicated in the secured log by listing the watermark of the trusted party making the modification and a timestamp associated with the time of the modification. At step 510, the integrity of the secured log may be validated as described prior to utilizing the secured log in unsealing the secured container.

At step 515, the imprinting of digital watermarks may commence with the selection a modification listed in the log maintained in secured storage. In certain embodiments, the modifications listed in the secured log may be in chronological order according to the timestamps associated with the modifications. In such scenarios, the modification may be selected from the secured log in chronological order, resulting in the watermark associated with the oldest modification to be the first to be imprinted on the secured container file. Once a modification listed in the secured log has been selected, at step 520, the watermark assigned to the trusted party making the modification and the timestamp associated with the modification are retrieved from the secured log.

The watermark of the trusted party and the timestamp may then be used at step 525 to imprint the secured container file according to the watermarking algorithm specified for the trusted party in the secured log. For instance, the watermarking algorithm of a trusted party may specify an initialization point for beginning the imprinting of watermarks on the secured container file. In certain scenarios, the initialization point may be unique for each trusted party. In other scenarios, a unique initialization point may be specified for each modification listed in the secured log. In certain embodiments, the initialization point may be specified as an offset from the beginning of the secured container file, where the offset may be determined as a function of the file size of the secured container.

With the initialization point determined for a modification listed in the secured log, the frequency of the imprints to be applied may also be determined based on the watermarking algorithm associated with the trusted party. In certain embodiments, the frequency of watermarking may be unique for each modification listed in the secured log. In other embodiments, the watermarking frequency may be unique for each trusted party. In certain embodiments, the watermarking frequency may be determined as a function of the file size of the secured container. As described, integrity validations for large secured container files may be relatively slow such that the described watermarking process should not result in significant additional delay. Accordingly, the frequency for imprinting watermarks may be selected as a function of the file size of the secured container, such that watermarks for larger secured container files are imprinted with greater space between the watermark imprints.

At the locations within the secured container that are specified by the watermarking algorithm, watermarks may be imprinted by performing an XOR bitwise operation at each of these locations. The initial watermark is imprinted using the XOR operation at the initialization point of the secured container file specified by the watermarking algorithm and successive watermarks are imprinted using the XOR operation at secured container locations determined using the frequency specified by watermarking algorithm. The XOR bitwise operation is performed using the contents of the secured container file at each location specified by the watermarking algorithm as one input and the digital watermark of the trusted party joined with the timestamp associated with the modification as the other input to the XOR operation. For each modification listed in the secured log, this process for sealing a secured container applies the described XOR operation beginning at each of the locations in the secured container file that are specified by the applicable watermarking algorithm.

This process of imprinting watermarks continues at step 530 until all modifications listed for a secured container in the secured log have been recorded via the descried process for imprinting watermarks. As described, the order in which the modifications that are listed in the secured log are applied in this sealing process is noted in order to correctly reverse the watermarks in the correct sequence during the unsealing process. If all changes listed in the secured log have been printed as watermarks on the secured container, at step 535 watermarking is completed and the sealing of the secured container is complete.

As described with regard to FIG. 4, a request may be received to validate the integrity of a secured container that has been modified and sealed with imprinted watermarks as described herein. In response to such a request, the secured container may then be unsealed in order to validate the integrity of each of the individual modifications and to recover the secured container file to be validated. The process of unsealing a secured container applies the described watermarking process in reverse to the sequence in which the watermarks were imprinted within the secured container. For instance, if the modifications listed the secured log are implemented based on the chronological order of the modifications, the unsealing process applies the same watermarking algorithm in the reverse chronological order of the listed modifications.

In a more specific illustrative example, a secured log may specify modifications to a secured container by a first trusted party made at a first time and may also specify modifications made by a second trusted party at a second time. Watermarks corresponding to these modifications are imprinted in the secured container, such that the modifications made by the first trusted party are recorded at the locations in the secured container specified by the watermarking algorithm of the first trusted party and modifications made by the second trusted party are subsequently recorded at the locations in the secured container specified by the watermarking algorithm of the second trusted party.

In order to unseal this secured container, these watermarks are reversed by applying the same watermarking algorithms of the two trusted parties in the reverse order. More specifically, the watermarking algorithm of the second trusted party is used to identify the locations of the imprints in the sealed container corresponding to the modifications by the second trusted party. The initialization point of the second trusted party is determined and the XOR watermarking algorithm is applied at this initialization point in the sealed, secured container, where one input of the XOR operation is the sealed, secured container starting that the initialization point and the other inputs is the assigned watermark of the second trusted party joined with timestamp of the second modification. The watermarking algorithm of the second trusted party is used to determine the frequency of the watermark imprints, which is used to locate each of the remaining imprints.

At each of these locations the XOR operation is repeated to reverse the reaming watermark imprints associated with this second modification. This operation serves to reverse each of the watermark imprints corresponding to the second modification. The same process is subsequently repeated using the watermarking algorithm of the first trusted party in order to reverse the watermark imprints corresponding to the modifications made by the first trusted party, where the XOR operation is applied with the sealed, secured container, now with the watermark imprints of the second trusted party reversed, as one input and the watermark of the first trusted party joined with the timestamp of the first modification as the other input.

In this manner, of the digital watermarks imprinted on the secured container may be sequentially reversed. If correctly applied, the unsealing process reverses all watermark imprints such that the original secured container file is restored. The integrity of the restored secured container file may then be verified by comparison of a signature calculated based on the unsealed secured container versus the reference signature for the secured container stored in the secured log prior to commencing the digital watermark imprinting process.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for recording and validating modifications to a secured container, the method comprising:
 generating a reference signature based on a state of the secured container prior to a first modification to the secured container and a second modification to the secured container;
 logging the first modification to the secured container by a first trusted party and the second modification to the secured container by a second trusted party, wherein the first logged modification identifies a first timestamp of the first modification and further identifies a first digital watermark assigned to the first trusted party, and wherein the second logged modification identifies a second timestamp of the second modification and further identifies a second digital watermark assigned to the second trusted party;
 sealing the secured container by imprinting the first digital watermark and the first timestamp at locations in the secured container specified by a first watermarking algorithm assigned to the first trusted party and subsequently imprinting the second digital watermark and the second timestamp at locations in the secured container specified by a second watermarking algorithm assigned to the second trusted party;

unsealing the secured container by removing the imprint of the second digital watermark and the second timestamp at the locations in the secured container specified by the second watermarking algorithm and subsequently removing the imprint of the first digital watermark and the first timestamp at locations in the secured container specified by the first watermarking algorithm;

generating an updated signature based on a state of the unsealed secured container; and validating the integrity of the secured container by comparing the updated signature to the reference signature.

2. The method of claim 1, wherein the first watermarking algorithm specifies an initialization point to begin imprinting the first digital watermark.

3. The method of claim 2, wherein the first watermarking algorithm specifies a frequency for imprinting the first digital watermark.

4. The method of claim 1, wherein the first digital watermark is imprinted via an XOR operation at the locations in the secured container specified by the first watermarking algorithm.

5. The method of claim 4, wherein the imprinting of the first digital watermark is reversed via the XOR operation at the locations in the sealed secured container specified by the first watermarking algorithm.

6. The method of claim 1, wherein the log is stored to a secured memory of the IHS.

7. An Information Handling System (IHS), comprising:
one or more processors;
a system memory coupled to the one or more processors, the system memory including program instructions stored thereon that, upon execution by the one or more processors, cause the IHS to:
generate a reference signature based on a state of a secured container prior to a first modification to the secured container and a second modification to the secured container;
log the first modification to a secured container by a first trusted party and the second modification to the secured container by a second trusted party, wherein the first logged modification identifies a first timestamp of the first modification and further identifies a first digital watermark assigned to the first trusted party, and wherein the second logged modification identifies a second timestamp of the second modification and further identifies a second digital watermark assigned to the second trusted party;
seal the secured container by imprinting the first digital watermark and the first timestamp at locations in the secured container specified by a first watermarking algorithm assigned to the first trusted party and subsequently imprinting the second digital watermark and the second timestamp at locations in the secured container specified by a second watermarking algorithm assigned to the second trusted party;
unseal the secured container by removing the imprint of the second digital watermark and the second timestamp at the locations in the secured container specified by the second watermarking algorithm and subsequently removing the imprint of the first digital watermark and the first timestamp at locations in the secured container specified by the first watermarking algorithm;
generate an updated signature based on a state of the unsealed secured container; and
validate the integrity of the secured container by comparing the updated signature to the reference signature.

8. The IHS of claim 7, wherein the log is stored to a secured memory of the IHS.

9. The IHS of claim 7, wherein the first watermarking algorithm specifies an initialization point to begin imprinting the first digital watermark.

10. The IHS of claim 9, wherein the first watermarking algorithm specifies a frequency for imprinting the first digital watermark.

11. The IHS of claim 7, wherein the first digital watermark is imprinted via an XOR operation at the locations in the secured container specified by the first watermarking algorithm.

12. The IHS of claim 11, wherein the imprinting of the first digital watermark is reversed via the XOR operation at the locations in the sealed secured container specified by the first watermarking algorithm.

13. A computer-readable storage device having program instructions stored thereon for recording and validating modifications to a secured container, upon execution by one or more processors of the IHS, the program instructions cause the one or more processors to:
generate a reference signature based on a state of the secured container prior to the first modification to the secured container and the second modification to the secured container;
log a first modification to the secured container by a first trusted party and the second modification to the secured container by a second trusted party, wherein the first logged modification identifies a first timestamp of the first modification and further identifies a first digital watermark assigned to the first trusted party, and wherein the second logged modification identifies a second timestamp of the second modification and further identifies a second digital watermark assigned to the second trusted party;
seal the secured container by imprinting the first digital watermark and the first timestamp at locations in the secured container specified by a first watermarking algorithm assigned to the first trusted party and subsequently imprinting the second digital watermark and the second timestamp at locations in the secured container specified by a second watermarking algorithm assigned to the second trusted party;
unseal the secured container by removing the imprint of the second digital watermark and the second timestamp at the locations in the secured container specified by the second watermarking algorithm and subsequently removing the imprint of the first digital watermark and the first timestamp at locations in the secured container specified by the first watermarking algorithm;
generate an updated signature based on a state of the unsealed secured container; and
validate the integrity of the secured container by comparing the updated signature to the reference signature.

14. The computer-readable storage device of claim 13, wherein the first watermarking algorithm specifies an initialization point to begin imprinting the first digital watermark.

15. The computer-readable storage device of claim 13, wherein the first watermarking algorithm specifies a frequency for imprinting the first digital watermark.

16. The computer-readable storage device of claim 13, wherein the first digital watermark is imprinted via an XOR operation at the locations in the secured container specified by the first watermarking algorithm.

17. The computer-readable storage device of claim 13, wherein the imprinting of the first digital watermark is reversed via the XOR operation at the locations in the sealed secured container specified by the first watermarking algorithm.

18. The computer-readable storage device of claim 13, wherein the log is stored to a secured memory of the IHS.

* * * * *